United States Patent [19]
Pripusich

[11] 3,806,911

[45] Apr. 23, 1974

[54] DISPLAY SEQUENCE CONTROL MEANS

[76] Inventor: Anthony Pripusich, 5035 S. Bishop, Chicago, Ill. 60609

[22] Filed: July 10, 1972

[21] Appl. No.: 270,210

[52] U.S. Cl. ............................... 340/325, 340/379
[51] Int. Cl. ............................................. G06m 3/06
[58] Field of Search ........................... 340/325, 379

[56] References Cited
UNITED STATES PATENTS

| | | | |
|---|---|---|---|
| 3,651,512 | 3/1972 | Summers | 340/325 |
| 449,108 | 3/1891 | Desant | 340/325 |
| 2,136,672 | 11/1938 | Calkins | 340/325 |

*Primary Examiner*—John W. Caldwell
*Assistant Examiner*—Marshall M. Curtis
*Attorney, Agent, or Firm*—Max R. Kraus

[57] ABSTRACT

A monitoring system for manually stepping the system through a series of steps making up a program and visually indicating the last step being monitored has two stepping switches wired for step by step advance under the control of a manual switch. The particular program as an example for which the system is wired is the Rosary. The system has lights to indicate the progress of the program and has a mechanical counter to total completed programs.

1 Claim, 3 Drawing Figures

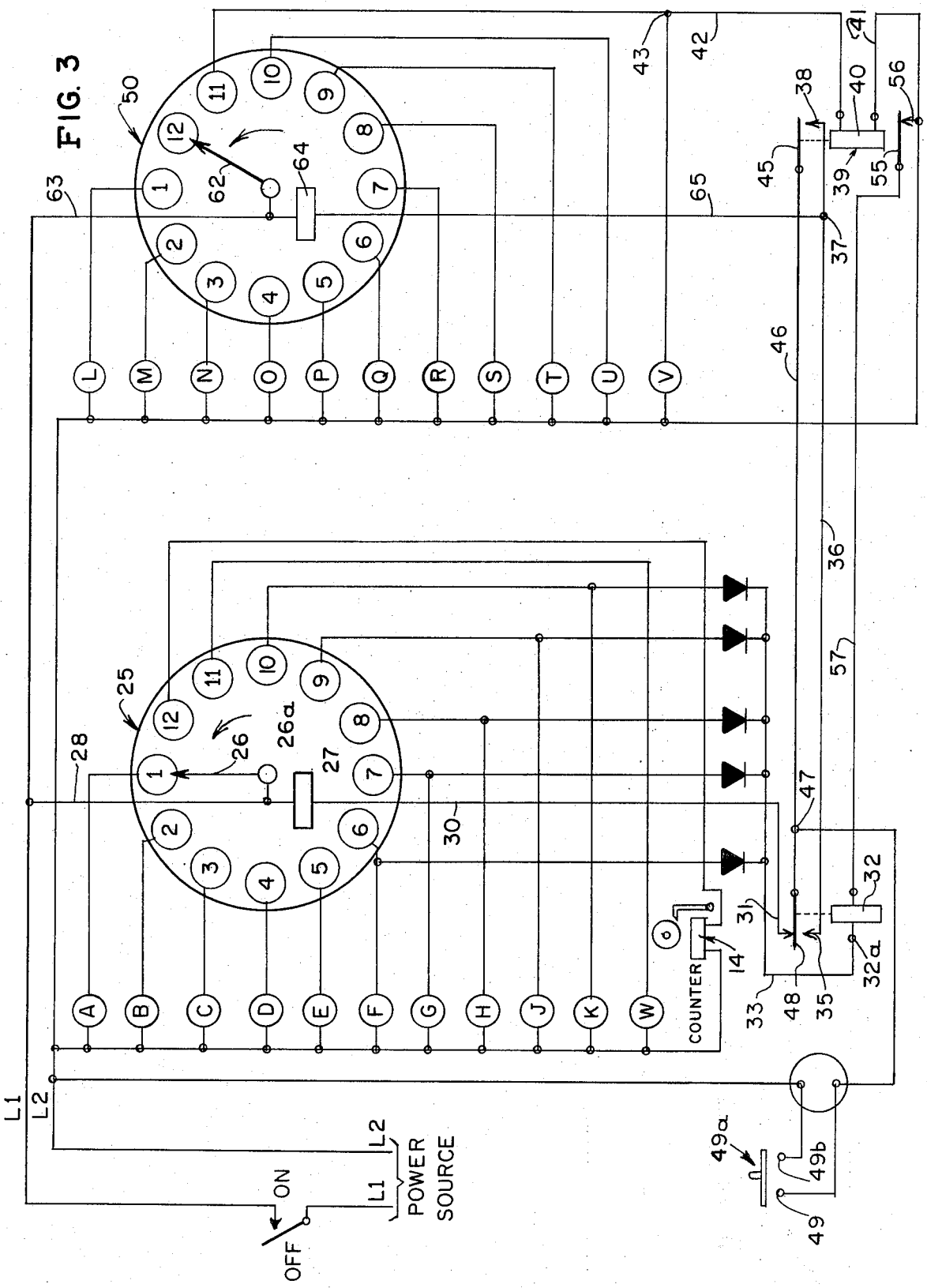

DISPLAY SEQUENCE CONTROL MEANS

This invention provides a program for use in connection with a series of steps such as prayers which should be taken in order. In particular the invention is useful in connection with a program for setting or reciting a series of prayers normally to be made in a predetermined order. The invention includes manually operated switch means controlling counting means in association with signal display means for showing the program progress of steps taken. The counting means control suitable visual display such as lamps or other means, the manually controlled switch to be operated after each step in a prayer has been concluded. In the event of interruption, the program means will show immediately at what stage the steps or prayers have been interrupted so that after such interruption a continuation of the procedure may be effected.

The drawings illustrate the visual display means for indicating the progress. The conclusion of a series of prayers will be suitably indicated by a counter, thus providing an indication of the complete number of prayers or other steps taken or accomplished.

While a device embodying the present invention may be used by individuals under various circumstances and conditions, it is particularly useful for those afflicted with infirmities of age or sickness or impairment of faculties and can be used in connection with prayers. In particular, a device embodying the present invention may be useful in connection with prayers associated with the Rosary in the Roman Catholic Church. Prayer beads have been used in othe religious faiths and thus may provide a field of use for the present invention. For convenience and ease of explanation, however, the invention will be described in connection with the Rosary, a series of prayers to be recited in predetermined order usually in connection with a string of beads in counting prayers. As an example, the Rosary, as a series of prayers, has five decades, each decade containing 10 Ave Marias, indicated by small beads in the string of beads, preceded by a Paternoster marked by a larger bead, and the entire series of individual prayers concluded by a Gloria Patri. In accordance with practice, five decades of prayers or beads make a Chaplet, this being a third of the Rosary.

In accordance with the application of the present invention to a Rosary, each prayer of each bead corresponding to a prayer, whether it be small or large, has corresponding thereto a suitable lamp or other visual signal operated by a manually operated push button switch. A device embodying the present invention requires some electrical source of power and this may be either a small battery or a connection to a conventional source of electric power, such as a 120 volt outlet.

A device embodying the present invention may range in size from a light, small portable device to a console. The new device embodying the present invention indicates to the praying individual the step by step advance in proper sequence by means of a visual display, beginning with the initiation of the Rosary through prescribed decades and a concluding prayer. In case of an interruption, a device embodying the present invention maintains its condition without change or disturbance of the setting of the sequence until the end of the Rosary has been reached, each step being advanced or marked by manual operation of the switch. Determination of the entire series of prayers will result in the device embodying the present invention assuming its starting position for a new series of prayers.

BRIEF DESCRIPTION OF THE DRAWINGS

The invention will be best described in connection with the drawings wherein:

FIG. 3 is a circuit diagram of the device embodying the present invention.

DESCRIPTION OF SPECIFIC EMBODIMENT

Figure 1:
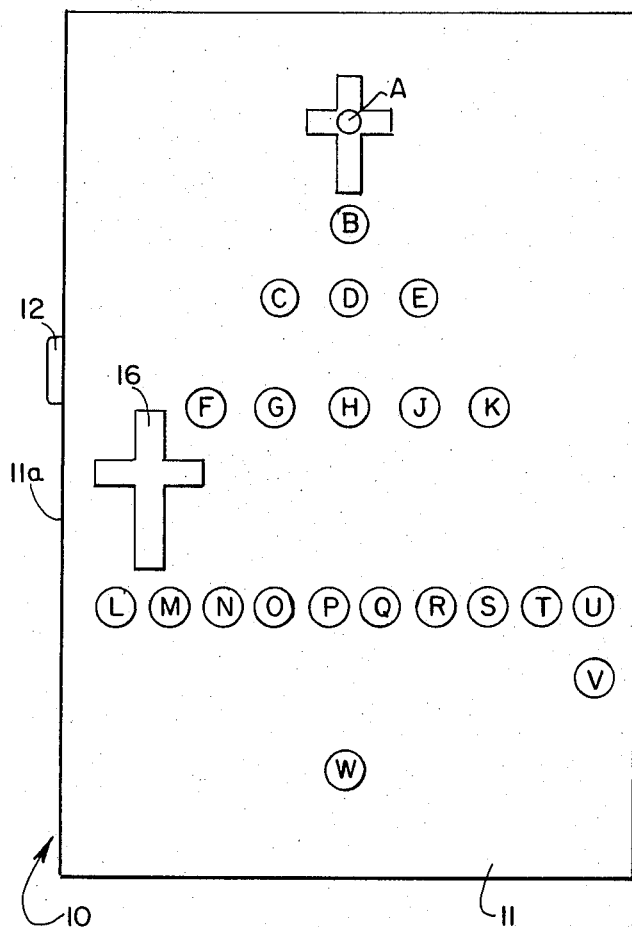
FIG. 1 is a front view of a device embodying the present invention, this view showing the panel.
Figure 2:
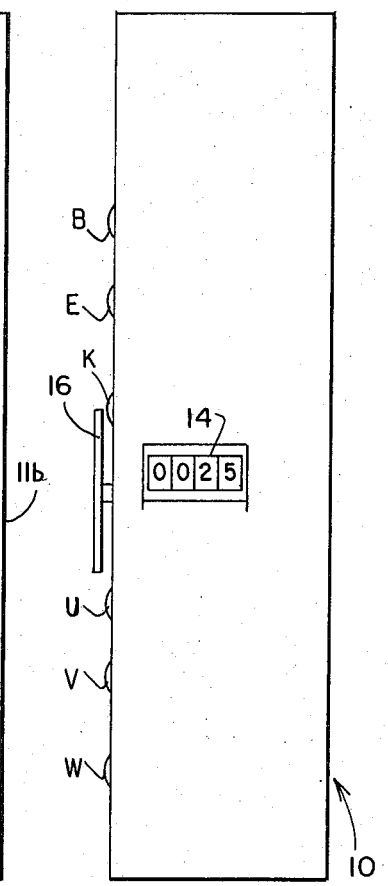
FIG. 2 is a side view showing a counter carried by the housing for indicating the total number of Rosaries accomplished.

A specific embodiment of the invention has housing 10 including front panel 11. Housing 10 may range in size from the size of a small portable transistorized radio (somewhat larger than a pack of cigarettes) to the size of a radio receiver such as is used in the home. Housing 10 may be of any suitable material such as plastic, wood or metal and has side walls 11a and 11b. Side wall 11a may have socket 12 for receiving a two pole plug connected by wires to a remote control switch, not shown.

Side wall 11b has counter 14 mounted therein, this counter having its indicating portion visible through a window in the side wall. As will be more fully explained later, counter 14 is adapted to be advanced by one unit each time a complete program has been completed.

Front panel 11 is provided with a plurality of windows arranged in a suitable pattern as illustrated, each window having a lamp. The windows are indicated by capital letters referring to lamps behind the windows, such lamps being energized to provide desired information or indication. The particular lamps are connected in the system, as more fully described in connection with FIG. 3. However, for purposes of the particular example or embodiment of the invention, lamp A may be mounted behind a cross, or crucifix, or any other desired symbol for display. Lamp B is disposed below the cross symmetrically with respect thereto. Lamps C, D and E are disposed behind windows in the panel and are arranged in a straight line below lamp B and symmetrically with respect thereto. Lamps F, G, H, J and K are disposed behind windows in a straight line below the line of lamps C to E inclusive.

Below the five windows corresponding to lamps F to K inclusive, and to one side is a cruciform-shaped switch handle 16 which is provided with a rod extending through an aperture in panel 11 on the housing and is adapted to control a simple switch, more fully explained in connection with the circuit diagram of FIG. 3.

Below the cruciform switch handle 16 is a line of windows across the panel for lamps L to U inclusive. Additional windows for lamps V and W are also provided. It is understood of course that all or some of these lamps may have transparent or translucent covers or there may be openings through which lamps may be visible. It is also possible to have one continuous window for a whole line of lamps such as L to U inclusive to avoid the necessity for individual windows.

Referring now to FIG. 3, an exemplary embodiment of the system embodying the present invention is disclosed, it being understood however that such embodiment is by way of example.

Lamps to K inclusive and W have one terminal of each lamp connected to power line L2 with other lamp terminals going to stepping positions 1 and 11 inclusive of stepping switch 25. Stepping switch 25 is here shown as of the mechanically actuated type used in telephone work and elsewhere, such switch having contact wiper 26 actuated by stepping winding 27, the arrangement being such that each time winding 27 is energized by an electric pulse, contact wiper 26 is advanced counterclockwise, one step at a time. It is understood that contact wiper 26 in this particular instance provides for the flow of electric current between axis 26a of rotation of contact wiper 26 and the particular positions from 1 to 12 inclusive of the contact wiper.

One terminal of stepping winding 27 is connected to wire 28 between power line L1 on the one hand and the gear or other part of 26a carrying contact wiper 26. The other terminal of stepping winding 27 is connected by wire 30 to normal contact 31 of relay 32. Relay 32 has its termianl 32a connected to wire 33, connected to a terminal of each of a number of diodes, whose other terminals are connected respectively to contacts 6 to 10 inclusive of stepping switch 25.

Returning to relay 32, off-normal contact 35 is connected by wire 36 to junction point 37 and continues to off-normal contact 38 of relay 39. Relay 39 has one terminal 40 of its winding connected to wire 41 going to power line L2 while this relay winding has its other terminal connected by wire 42 to junction point 43 connected to contact or pin 11 of stepping switch 50 whose general construction is the same as stepping switch 25. Junction point 43 is also connected through lamp V to power line L2. Relay 39 has movable contact 45 normally biased away from off-normal contact 38, this movable contact 45 being connected by wire 46 to junction point 47. Junction point 47 is connected to movable contact 48 of relay 32 and is also connected to terminal 49 of manually operated switch 49a. Switch 49a has an additional contact 49b which is connected to power line L2.

Referring to relay 39, movable contact 55 is adapted to move with movable contact 45 when the relay winding is energized. Movable contact 55 cooperates with normal contact 56 connected by wire 57 to the lower terminal of the winding of relay 32.

Referring now to stepping switch 50, this has wiper contact 62 whose inner end is electrically connected to wire 63 going to power line L1, this wire 63 also being connected to the one terminal of stepping winding 64 whose other terminal is connected by wire 65 to junction point 37. Stationary contacts numbered 1 to 11 inclusive of stepping switch 50 sre respectively connected through wires to lamps L to V, the other terminals of each of these lamps being connected to power line L2. Stationary contact 12 of stepping switch 50 is dead. The wipers in both stepping switches 25 and 50 are advanced in a counterclockwise direction.

OPERATION

The operation of the system will now be described. The circuit diagram illustrated in FIG. 3 shows the system in normal standby condition. Stepping switches 25 and 50 are respectively in 1 and 12 positions. The off-on switch in power line L1 is now closed and current will flow from line L1 through wire 28 to wiper 26, stepping switch contact 1 of stepping switch 25 through lamp A to line L2. Lamp A is illuminated and being at the crucifix window, will indicate the beginning of the Rosary prayer sequence. At this time, the user recites the Apostle's Creed and after finishing this, the user closes switch 49a for a short time. Switch 49a may be a snap switch type to prevent the closure of the switch for longer than necessary.

Momentary closure of switch 49a will establish a circuit from line L2 through wire 47 to contact 48 of relay 32 thence to normal contact 31 and wire 30 to the top terminal of winding 27 of stepping switch 25. The bottom terminal of this winding has the circuit completed through wire 28 to line L1. Stepping switch 25 advances from contact position 1 to contact position 2 of the bank of stationary contacts. When wiper 26 of stepping switch 25 advances to stationary contact 2 of the stepping switch, lamp A goes out and lamp B is energized. With wiper 26 of stepper 25 in the second position, and lamp B energized, the next prayer in the Rosary sequence is the Our Father. When finished with this, the user depresses and releases switch 49a to advance the wiper to the third position. In this third position, lamp B goes out and lamp C is energized. The third Rosary sequence is a Hail Mary. Switch 49a is again operated to advance wiper 26 to position 4. Lamp D indicates that the appropriate prayer is another Hail Mary.

When the prayer corresponding to the energization of lamp D is completed, switch 49a is again operated and relay 25 advances to position 5 whereupon lamp E is energized, the preceding lamp D having been extinguished. The activation of lamp E marks the fifth position of the Rosary sequence and requires a third Hail Mary. When this particular prayer is finished, switch 49a is again operated to advance stepping switch 25 so that the wiper 26 is now on contact 6. In this position, lamp F is activated. An auxiliary circuit from contact 6 of stepping switch 25 goes through a diode to wire 33 and terminal 32a of the winding for relay 32. The bottom terminal of the winding for relay 32 is connected by wire 57 through normal contact 56 and movable contact 55 of relay 39 to wire 41 going to line L2. This results in the winding of relay 32 being energized, movable contact 48 of this relay being pulled down against off-normal contact 35. This position initiates the five decades of the Rosary, each decade consisting of one Our Father, 10 Hail Marys, and one Glory. At this position of stepping switch 25 having its wiper 26 at contact 6 and lamp F energized, the user recites the first Our Father of the Rosary decade. When finished with this prayer the user operates switch 49a to advance to the next position in the Rosary.

In the seventh position, lamp F (for the sixth position) remains energized due to the fact that relay 32 has pulled movable contact 48 down against off-normal contact 35, the circuit now going to junction 37 and wire 65 to the top terminal of winding 64 of stepping switch 50. This advances stepping switch 50 from dead contact or pin 12 to 1 position, thus causing lamp L to be energized. In this position of stepping switches 25 and 50, the first Hail Mary is uttered together with a prayer after which switch 49a is operated to advance stepping switch 25. As stepping switch 25 is advanced by successive operations of manual switch 49a and each prayer from the eighth position through to the sixteenth position, lamp F remains energized, the user advancing the stepping switch to each succeeding position by successive operations of switch 49a and reciting nine successive Hail Marys. Each time user operates push button switch 49a, stepping switch 50 is energized to advance wiper 62 from position 1 through position 10. When finished with 10 Hail Marys, the user depresses and releases the push button switch to advance to the next position in the Rosary.

The next position in the sequence completes the circuit through the lower contacts of relay 32 and advances the wiper for stepping switch 50 to position 11. When wiper 62 reaches contact 11 of stepping switch 50, the winding of relay 39 is energized, breaking the circuit through the wiper contacts of relay 39 to the winding of relay 32. Contact or pin 11 of stepping switch 50, when reached by wiper 62, results in lamp V being energized, denoting the end of one decade and concluding with the Glory prayer.

When push button 49a is closed again, current flows through the lower contacts of relay 39 and the upper contacts of relay 32, thereby advancing stepping switch 50 to the 12 position, which is dead and results in breaking the circuit to the winding of relay 39. At the same time, wiper 26 of stepping switch 25 is advanced to the 7 position where lamp G is activated and calls for the second Our Father of the Rosary decade. At the same time an energizing circuit through a diode from contact 7 of stepping switch 25 causes winding 32 of the relay to be energized at which current flow through the lower contacts of relay 32 operates stepping switch 50 to again advance stepping switch 50 to the 1 position from its dead 12 position. The succession of prayers and switch operations results in the stepping switches operating to energize lamps H, J and K, each of these lamp energizations being followed by steps in successive decades.

The following table indicates the lamp energization corresponding to the various stepper positions, following manipulation of the manual switch. From 1 to 6 manual switch operations, lamps A to F inclusive, individually and successively light up. From the sixth manual switch closure, F remains lit through to the 17th switch operation. Lamps L to V inclusive are successively on. Then on the 18th operation of the manual switch, F goes out and G goes on. Again lamps L to V inclusive successively go on with successive switching. This operation proceeds through lamps H, J and K, each one of H, J and K having stepper 50 run through lamps L to V inclusive. After K goes on, the decade and Hail Mary are taken care of and then lamp W follows to end the Rosary.

Operating push button 49a now advances stepping switch 25 to 12 position, this resulting in the coil of the counter being energized for partial step-up. Again push button switch 49a when closed advances stepping switch 25 to 1 position which breaks the circuit to the counter operating winding, permitting the counter to register a full numeral and also activates lamp A. The counter is preferably non-resettable thus permitting the user to keep count of the Rosaries recited for any desired period. Stepping switch 25 is now left in the 1 position while stepping switch 50 is left in the 12 position, these two positions being the normal standby position.

While the mechanical stepping switches having electrical means for advancing the same are disclosed, the invention is not limited thereto. Instead, transistorized circuitry utilizing counting circuits may be relied upon. Such circuitry is useful and has been widely used in connection with counting items from a suitable source such as, for example, sheets from a printing press, stampings from a press, or other mechanical device. Apart from monitoring prayers or other steps in a program, the device or system embodying the present invention may be used in connection with a speech or the presentation of arguments wherein certain points are to be covered. Other uses for a system embodying the present invention will occur such as, for example, certain procedures in medical or physical rountines an the like.

A remote switch having a cord and plug for socket 12 may be used. The remote switch is in parallel to switch 49a and may be of any suitable type which can be operated by movement of any part of a person, such as fingers of hand or feet or rolling or movement of head, or even voice controlled. Individual lamps may carry desired indicia.

TABLE I

SEQUENCE AND FUNCTION

| LAMP | MANUAL SWITCH FUNCTION | DESCRIPTION |
| --- | --- | --- |
| a | 1 | Apostles'Creed |
| B | 2 | Our Father |
| C | 3 | Hail Mary |
| D | 4 | Hail Mary |
| E | 5 | Hail Mary |
| F | 6 | Our Father (1st) |
| G | 18 | Our Father (2nd) |
| H | 30 | Our Father (3rd) |
| J | 42 | Our Father (4th) |
| K | 54 | Our Father (5th) |
| L | 7,19,31,43,55 | Hail Mary (1st) |
| M | 8,20,32,44,56 | Hail Mary (2nd) |
| N | 9,21,33,45,57 | Hail Mary (3rd) |
| O | 10,22,34,46,58 | Hail Mary (4th) |
| P | 11,23,35,47,59 | Hail Mary (5th) |
| Q | 12,24,36,48,60 | Hail Mary (6th) |
| R | 13,25,37,49,61 | Hail Mary (7th) |
| S | 14,26,38,50,62 | Hail Mary (8th) |
| T | 15,27,39,51,63 | Hail Mary (9th) |
| U | 16,28,40,52,64 | Hail Mary (10th) |
| V | 17,29,41,53,65 | Glory |
| W | 66 | Hail, Holy Queen |
| — | 67 | Counter |

What is claimed is:

1 A device for visually indicating the progress of a predetermined program, said device comprising two rotary stepping switches, each having a wiper stepping over successive contacts in a series of contacts and having a normal rest position; one stepping switch having its series of contacts divided into one group consisting of one or more successive contacts, beginning with the first contact in such series, and a second group continuing with the remaining contcts of the series, except for the end contact, and distinguished from said first group by having a control connection; the other stepping switch having only its last contact dead; an indicating lamp corresponding to each of the contacts except the last in both stepping switches; an electric power circuit connected to all the lamps and the wipers so that a lamp corresponding to any one contact will be lit when a wiper is at a contact; a power circuit including a manual, normally open switch for driving a stepping switch wiper, one contact at a time, control circuits including a first relay and a second relay, said first relay being controlled by said control connections through isolation means to said second group of contacts of said first switch, said second relay being controlled by said control connections to said second group of contacts of said first switch, said first relay disabling further stepping of said first stepping switch by opening the power circuit for said first stepping switch, and said second relay disabling said first relay thereby enabling further stepping of said first stepping switch, said control connections providing that after the first stepping switch wiper has reached the first contact of the second group, further operation of the manual switch results in stepping the second stepping switch wiper through its series of contacts only, after which the first stepping switch wiper advances one further contact in said second group, the circuit connections providing that after the first wiper reaches the last contact, further stepping action is terminated and the system is ready for a repetition of its program, whereby the sequence of stepping patterns is altered during a program.

* * * * *